United States Patent
Takahama et al.

(10) Patent No.: US 11,427,988 B2
(45) Date of Patent: Aug. 30, 2022

(54) DISPLAY CONTROL DEVICE AND DISPLAY CONTROL METHOD

(71) Applicant: KOMATSU LTD., Tokyo (JP)

(72) Inventors: Kazuhisa Takahama, Tokyo (JP); Yukinori Matsumura, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 17/049,157

(22) PCT Filed: Mar. 12, 2019

(86) PCT No.: PCT/JP2019/010088
§ 371 (c)(1),
(2) Date: Oct. 20, 2020

(87) PCT Pub. No.: WO2020/003631
PCT Pub. Date: Jan. 2, 2020

(65) Prior Publication Data
US 2021/0238828 A1    Aug. 5, 2021

(30) Foreign Application Priority Data

Jun. 29, 2018 (JP) .............................. JP2018-125426

(51) Int. Cl.
*E02F 9/26* (2006.01)
*H04N 13/122* (2018.01)
*H04N 13/363* (2018.01)

(52) U.S. Cl.
CPC .......... *E02F 9/265* (2013.01); *H04N 13/122* (2018.05); *H04N 13/363* (2018.05)

(58) Field of Classification Search
CPC .......... E02F 9/265; E02F 9/26; H04N 13/122; H04N 13/363; G09G 5/00; G09G 5/377
USPC ........................................................... 348/42
See application file for complete search history.

(56) References Cited

U.S. PATENT DOCUMENTS

| 5,996,702 | A | 12/1999 | Hall | |
|---|---|---|---|---|
| 9,824,490 | B1 * | 11/2017 | Cote | ....................... E02F 9/261 |
| 2003/0147727 | A1 * | 8/2003 | Fujishima | ................ H04Q 9/10 414/200 |

(Continued)

FOREIGN PATENT DOCUMENTS

| CA | 3029812 | 3/2018 |
|---|---|---|
| JP | 2013-113044 | 6/2013 |

(Continued)

*Primary Examiner* — Tung T Vo
(74) *Attorney, Agent, or Firm* — Fish & Richardson P.C.

(57) ABSTRACT

A captured image acquisition unit acquires an image captured by an imaging device provided at a place of a work machine where a bucket is included in an imaging range. A posture acquisition unit acquires posture information of the bucket. A topography acquisition unit acquires topographical information indicating a three-dimensional shape of a construction target of the work machine. A projected image generation unit generates, based on the posture information of the bucket and the topographical information, a projected image obtained by projecting teeth of the bucket on the construction target. A display control unit outputs a display signal for displaying by superimposing the projected image on a place where at least the bucket appears, in the captured image.

9 Claims, 10 Drawing Sheets

(56) References Cited

U.S. PATENT DOCUMENTS

| | | | |
|---|---|---|---|
| 2013/0222573 A1* | 8/2013 | Onuma | H04N 7/18 |
| | | | 348/82 |
| 2017/0298595 A1* | 10/2017 | Machida | E02F 9/261 |
| 2018/0051446 A1* | 2/2018 | Yoshinada | E02F 9/205 |
| 2018/0155902 A1* | 6/2018 | Fujita | E02F 9/26 |
| 2018/0192019 A1* | 7/2018 | Fujita | B60Q 9/00 |
| 2019/0281264 A1* | 9/2019 | Fujita | H04N 9/3179 |
| 2019/0308502 A1* | 10/2019 | Yoneyama | B60S 1/04 |
| 2019/0330825 A1 | 10/2019 | Tanimoto et al. | |
| 2020/0299924 A1* | 9/2020 | Kurokawa | E02F 3/963 |
| 2021/0002862 A1* | 1/2021 | Ono | B60K 35/00 |
| 2021/0010244 A1* | 1/2021 | Ito | G02B 27/0172 |
| 2021/0087794 A1* | 3/2021 | Yamamoto | E02F 3/32 |

FOREIGN PATENT DOCUMENTS

| | | |
|---|---|---|
| JP | 2016-160741 | 9/2016 |
| JP | 2018-035645 | 3/2018 |
| WO | WO2018/043299 | 3/2018 |

\* cited by examiner

DISPLAY CONTROL DEVICE AND DISPLAY CONTROL METHOD

CROSS-REFERENCE TO RELATED APPLICATIONS

This application is a National Stage application under 35 U.S.C. § 371 of International Application No. PCT/JP2019/010088, filed on Mar. 12, 2019, which claims priority to Japanese Patent Application No. 2018-125426, filed on Jun. 29, 2018. The contents of the prior applications are incorporated herein in their entirety.

TECHNICAL FIELD

The present invention relates to a method for manufacturing a reactor and a reactor.

BACKGROUND ART

In Patent Literature 1, in order to allow an operator to grasp a positional relationship between a bucket and a construction target when performing remote operation a backhoe, there is disclosed a technique of superimposing a teeth position image, which is obtained by projecting teeth of the bucket on a ground surface, on an image captured by an imaging device provided in the backhoe. In addition, in Patent Literature 1, in order to allow the operator to grasp a positional relationship between the bucket and the construction target when performing remote operation a loading excavator, there is disclosed a technique of superimposing a teeth position image, which is obtained by projecting the teeth of the bucket in a horizontal direction, on an image captured by the imaging device.

CITATION LIST

Patent Literature

Patent Literature 1
Japanese Unexamined Patent Application, First Publication, No. 2016-160741

SUMMARY OF INVENTION

Technical Problem

However, in a case where the teeth of the bucket face the front of a work machine, such as a loading excavator and a wheel loader, the teeth position image appears on an excavation surface of the construction target. However, in a case where the teeth of the bucket are projected on the excavation surface of the construction target, a part or the entirety of a projected position is a shadow of the bucket, and thus there is a possibility that the operator cannot visually recognize the teeth position image.

An object of the present invention is to provide a display control device and a display control method, which are to solve the problems described above.

Solution to Problem

A first aspect of the present invention provides a display control device that displays an image provided for operating a work machine including a bucket of which teeth face front. The display control device includes: a captured image acquisition unit that is configured to acquire an image captured by an imaging device provided at a place of the work machine where the bucket is included in an imaging range; a posture acquisition unit that is configured to acquire posture information of the bucket; a topography acquisition unit that is configured to acquire topographical information indicating a three-dimensional shape of a construction target of the work machine; a projected image generation unit that is configured to generate, based on the posture information and the topographical information, a projected image obtained by projecting the teeth of the bucket on the construction target; and a display control unit that outputs a display signal for displaying by superimposing the projected image on a place where at least the work equipment appears in the captured image.

Advantageous Effects of Invention

In the at least one aspect, the operator can easily recognize a teeth position of a portion that is the shadow of the bucket.

DESCRIPTION OF EMBODIMENTS

First Embodiment

<<Work System>>

Figure 1:
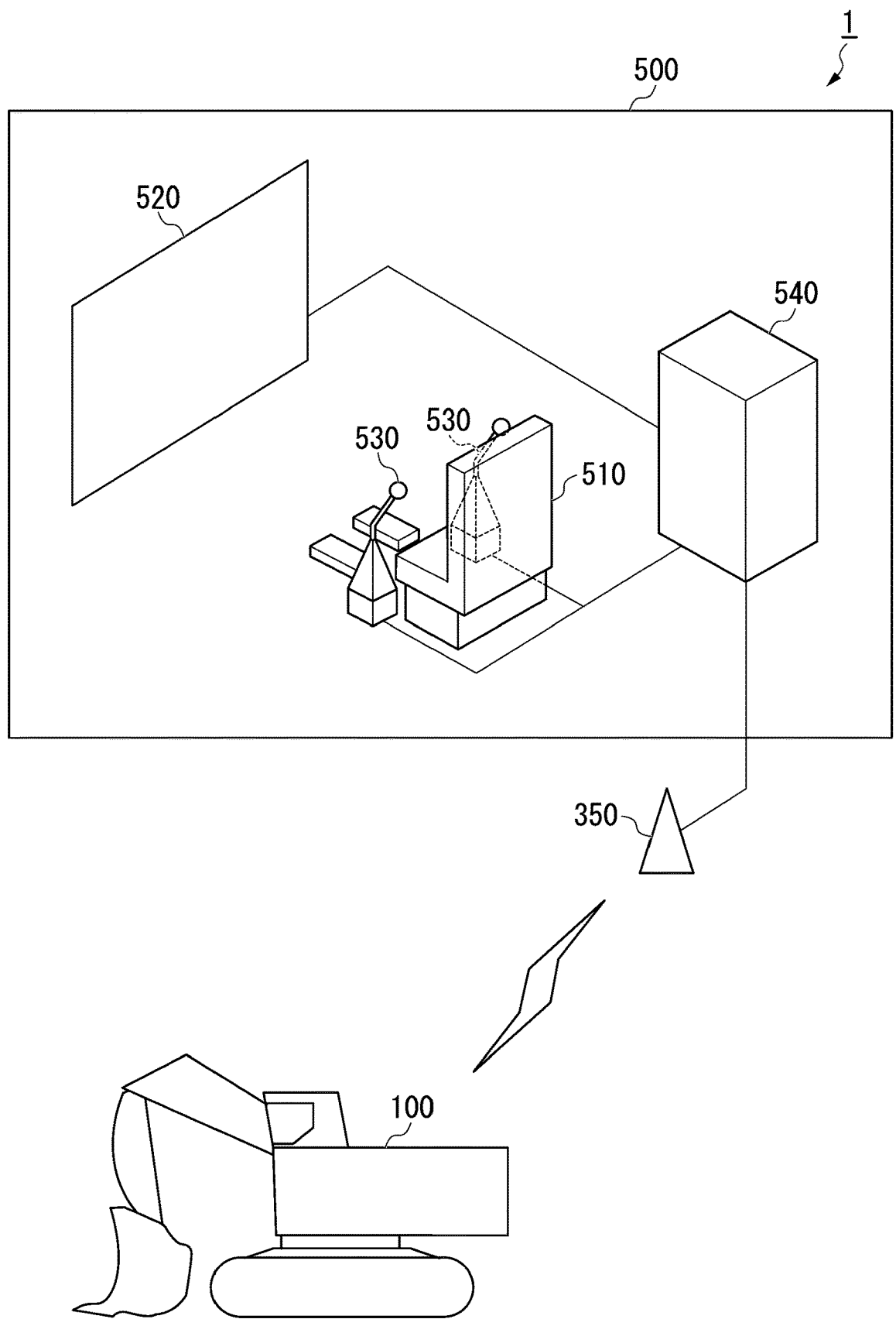
FIG. 1 is a schematic view illustrating a configuration of a remote operation system according to a first embodiment.

FIG. 1 is a schematic view illustrating a configuration of a remote operation system according to a first embodiment.

A work system 1 includes a work machine 100 and a remote operation room 500. The work machine 100 operates at a work site (for example, a mine and a quarry). The remote operation room 500 is provided at a location away from the work site (for example, a city and an inside of the work site). That is, an operator performs remote operation of the work machine 100 from a distance where the work machine 100 cannot be visually recognized.

The work machine 100 is performed remote operation based on an operation signal transmitted from the remote operation room 500. The work machine 100 and the remote operation room 500 are connected to each other through communication via an access point 350. The operation signal indicating operation by the operator, which is received from the remote operation room 500, is transmitted to the work machine 100 via the access point 350. The work machine 100 operates based on the operation signal received from the remote operation room 500. That is, the work system 1 includes a remote operation system configured by the work machine 100 and the remote operation room 500. The access point 350 is used in communication of the remote operation system. In addition, the work machine 100 captures an image of a construction target, and the image is displayed in the remote operation room 500. That is, the work system 1 is an example of a display control system.

<<Work Machine>>

Figure 2:
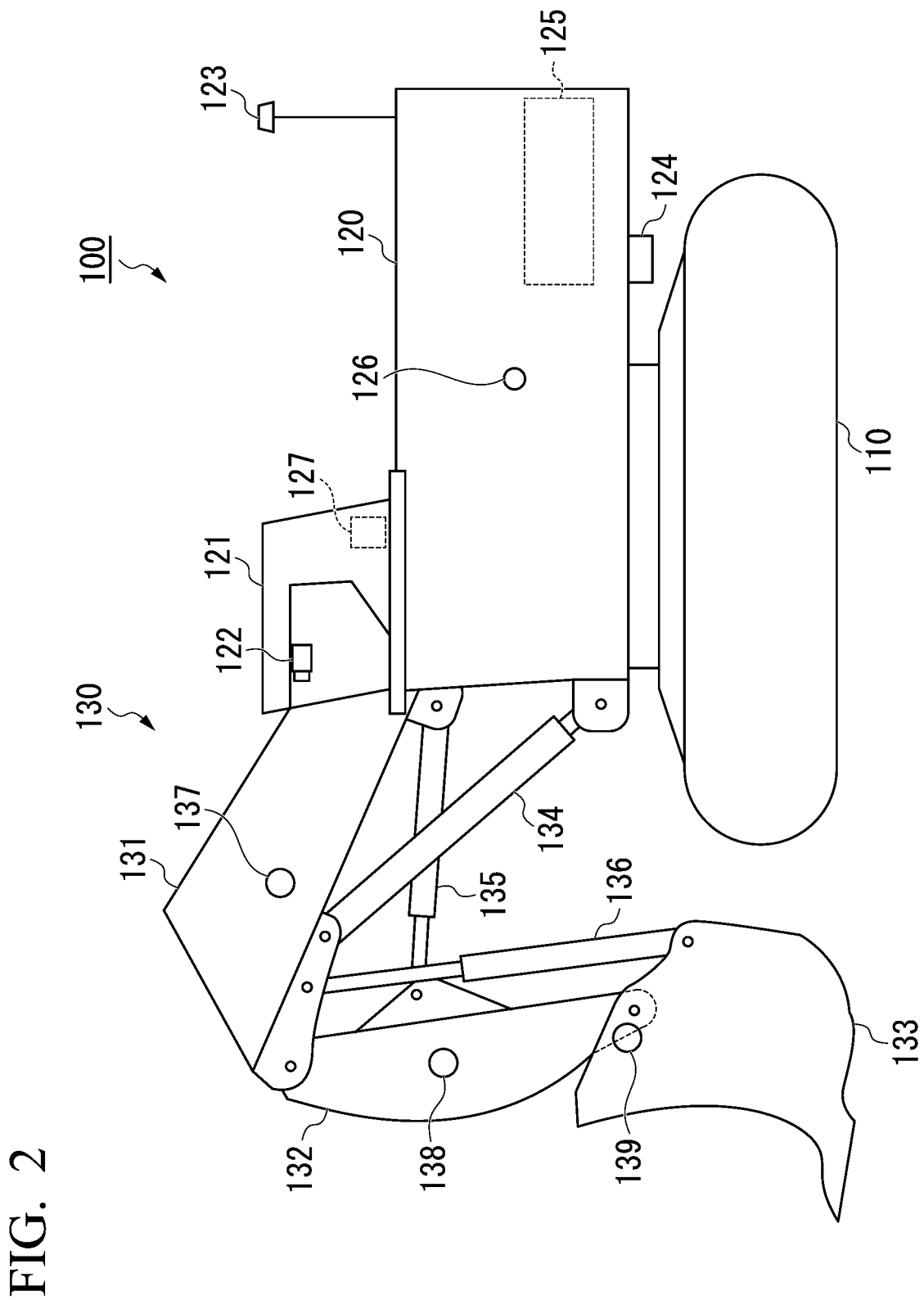
FIG. 2 is an external view of a work machine according to the first embodiment.

FIG. 2 is an external view of the work machine according to the first embodiment. The work machine 100 according to the first embodiment is a loading excavator (face excavator). The work machine 100 according to another embodiment may be another work machine having a bucket of which teeth face front, such as a wheel loader or a bulldozer. The work machine 100 includes a travel body 110, a swing body 120 that is supported by the travel body 110, and work equipment 130 that is operated by a hydraulic pressure and is supported by the swing body 120. The swing body 120 is supported to be swingable around a swing center O (refer to FIG. 5). The work equipment 130 is provided at a front portion of the swing body 120.

The work equipment 130 includes a boom 131, an arm 132, and a bucket 133. The work equipment 130 is driven as a boom cylinder 134, an arm cylinder 135, and a bucket cylinder 136 expand and contract. A boom angle sensor 137, an arm angle sensor 138, and a bucket angle sensor 139 are respectively mounted on the boom 131, the arm 132, and the bucket 133.

A base end portion of the boom 131 is attached to the swing body 120 via a pin.

The arm 132 connects the boom 131 to the bucket 133. A base end portion of the arm 132 is attached to a tip portion of the boom 131 via a pin.

The bucket 133 includes a blade for excavating earth and a container for accommodating the excavated earth. A base end portion of the bucket 133 is attached to a tip portion of the arm 132 via a pin.

The boom cylinder 134 is a hydraulic cylinder for operating the boom 131. A base end portion of the boom cylinder 134 is attached to the swing body 120. A tip portion of the boom cylinder 134 is attached to the boom 131.

The arm cylinder 135 is a hydraulic cylinder for driving the arm 132. A base end portion of the arm cylinder 135 is attached to the boom 131. A tip portion of the arm cylinder 135 is attached to the arm 132.

The bucket cylinder 136 is a hydraulic cylinder for driving the bucket 133. A base end portion of the bucket cylinder 136 is attached to the boom 131. A tip portion of the bucket cylinder 136 is attached to the bucket 133.

The boom angle sensor 137 is attached to the boom 131 and detects an inclination angle of the boom 131.

The arm angle sensor 138 is attached to the arm 132 and detects an inclination angle of the arm 132.

The bucket angle sensor 139 is attached to the bucket 133 and detects an inclination angle of the bucket 133.

The boom angle sensor 137, the arm angle sensor 138, and the bucket angle sensor 139 according to the first embodiment each detect an inclination angle with respect to a horizontal plane. An angle sensor according to another embodiment is not limited thereto and may detect an inclination angle with respect to another reference plane. For example, in another embodiment, an angle sensor may detect a relative rotation angle by a potentiometer provided at each of the base end portions of the boom 131, the arm 132, and the bucket 133, or may detect an inclination angle by measuring a cylinder length of each of the boom cylinder 134, the arm cylinder 135, and the bucket cylinder 136 and converting the cylinder length into an angle.

Figure 3:
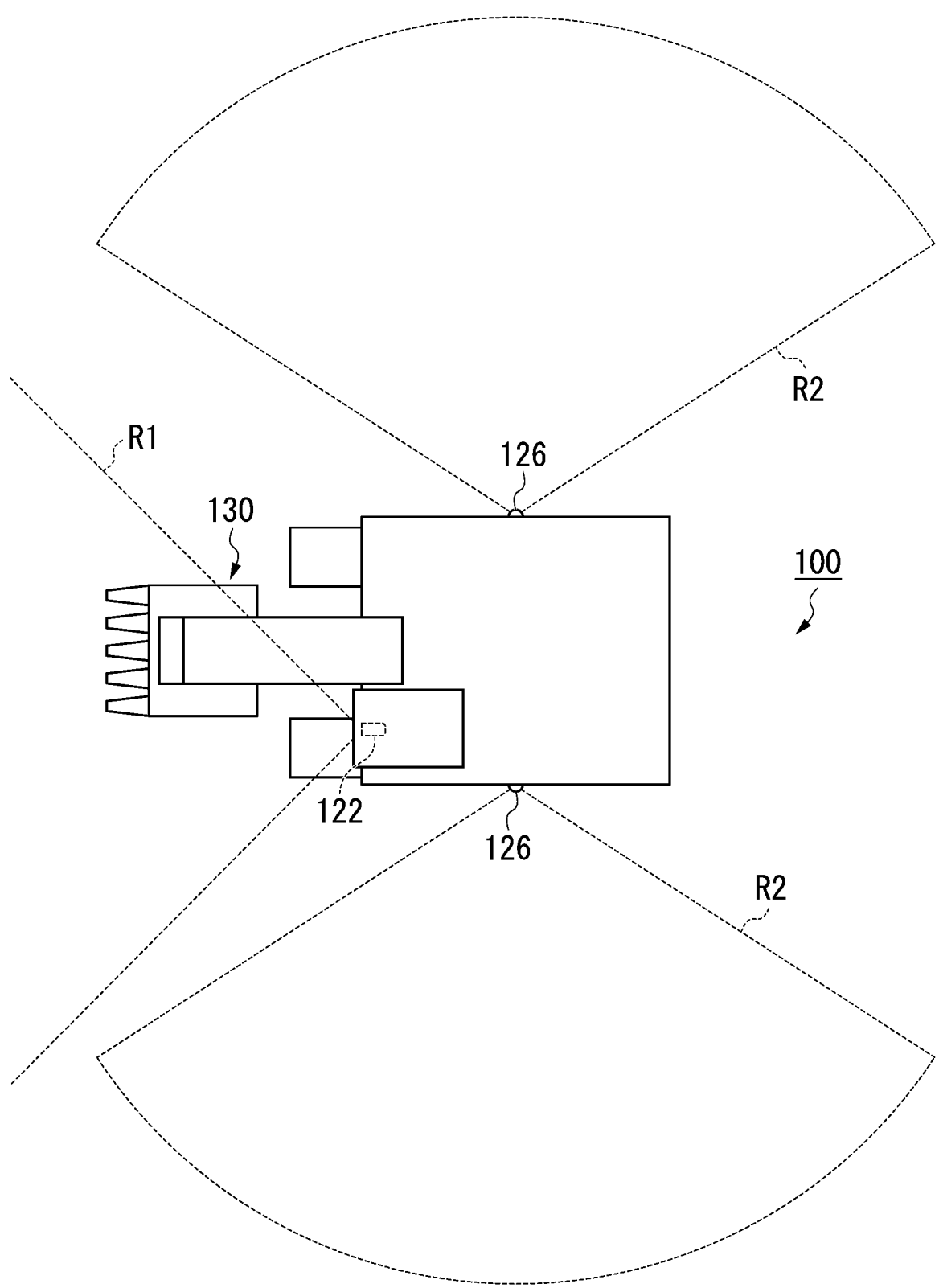
FIG. 3 is a top view illustrating provision positions of an imaging device and a depth detection device in the work machine according to the first embodiment.

FIG. 3 is a top view illustrating provision positions of an imaging device and a depth detection device in the work machine according to the first embodiment.

The swing body 120 includes a cab 121. The cab 121 is provided with an imaging device 122. The imaging device 122 is provided in an upper front portion in the cab 121. The imaging device 122 captures an image of the front of the cab 121 through a windshield in a front portion of the cab 121. Herein, the "front" refers to a direction in which the work equipment 130 is mounted on the swing body 120, and the "rear" refers to a direction opposite to the "front". The "side" refers to a direction (right-and-left direction) intersecting the front-and-rear direction. An example of the imaging device 122 includes an imaging device using a charge coupled device (CCD) sensor and a complementary metal oxide semiconductor (CMOS) sensor. In another embodiment, the imaging device 122 may not necessarily have to be provided in the cab 121, and it is sufficient that the imaging device 122 is provided at a position where at least a construction target and the work equipment 130 can be imaged as illustrated in FIG. 3. That is, an imaging range R1 of the imaging device 122 includes at least part of the work equipment 130.

The work machine 100 includes the imaging device 122, a position and azimuth direction calculator 123, an inclination measuring instrument 124, a hydraulic device 125, a depth detection device 126, and a control device 127.

The position and azimuth direction calculator 123 calculates a position of the swing body 120 and an azimuth direction in which the swing body 120 faces. The position and azimuth direction calculator 123 includes two receivers that receive positioning signals from an artificial satellite that configures GNSS. The two receivers are provided at positions different from each other on the swing body 120. The position and azimuth direction calculator 123 detects a position of a representative point of the swing body 120 in a site coordinate system (the origin of an excavator coordinate system) based on the positioning signals received by the receivers.

The position and azimuth direction calculator 123 uses respective positioning signals received by the two receivers to calculate an azimuth direction in which the swing body 120 faces as a relationship between a provision position of one receiver and a provision position of the other receiver.

In another embodiment, the position and azimuth direction calculator 123 may detect an azimuth direction in which the swing body 120 faces based on a measurement value of a rotary encoder or an IMU.

The inclination measuring instrument 124 measures the acceleration and angular speed of the swing body 120, and detects a posture (for example, a roll angle, a pitch angle, a yaw angle) of the swing body 120 based on the measurement result. The inclination measuring instrument 124 is provided, for example, on a lower surface of the swing body 120. The inclination measuring instrument 124 can use, for example, an inertial measurement unit (IMU).

The hydraulic device 125 includes a hydraulic oil tank, a hydraulic pump, and a flow rate control valve. The hydraulic pump is driven by the power of an engine (not illustrated) and supplies a hydraulic oil to the boom cylinder 134, the arm cylinder 135, and the bucket cylinder 136 via the flow rate control valve. The flow rate control valve has a spool having a rod shape and adjusts the flow rate of the hydraulic oil supplied to the boom cylinder 134, the arm cylinder 135, and the bucket cylinder 136 depending on a position of the spool. The spool is driven based on a control command received from the control device 127. That is, the amount of hydraulic oil supplied to the boom cylinder 134, the arm cylinder 135, and the bucket cylinder 136 is controlled by the control device 127.

The depth detection device 126 detects a depth in a detection range R2. The depth detection devices 126 are provided on both side surfaces of the swing body 120, and each detect a surrounding depth including a construction target in the detection range R2 with an axis extending in a width direction of the swing body 120 as a center. The depth is a distance from the depth detection device 126 to a target. Accordingly, when the work machine 100 excavates earth with the work equipment 130, the depth detection device 126 can detect the depth of a transport vehicle (not illustrated) that is stopped to the side of the work machine 100 and is a target to be loaded with the earth. In addition, when the work machine 100 loads the earth onto the transport vehicle, the depth detection device 126 can detect the depth of the construction target.

As illustrated in FIG. 3, the depth detection device 126 is provided at a position where the work equipment 130 does not interfere with the detection range R2. Examples of the depth detection device 126 include a LiDAR device, a radar device, and a stereo camera.

The control device 127 transmits, to the remote operation room 500, an image captured by the imaging device 122, the swinging speed, position, azimuth direction, and inclination angle of the swing body 120, inclination angles of the boom 131, the arm 132, and the bucket 133, the traveling speed of the travel body 110, and depth information detected by the depth detection device 126. The position and direction of the teeth of the bucket 133 can be calculated using the swinging speed, position, azimuth direction, and inclination angle of the swing body 120 and the inclination angles of the boom 131, the arm 132, and the bucket 133. Hereinafter, the position and direction of teeth of the bucket 133 will also be referred to as bucket posture information representing the posture of the bucket 133. In addition, information such as the swinging speed, position, azimuth direction, and inclination angle of the swing body 120, which are used in calculating the position and direction of the teeth of the bucket 133, and the inclination angles of the boom 131, the arm 132, and the bucket 133 are also examples of the bucket posture information. That is, the position and azimuth direction calculator 123, the inclination measuring instrument 124, the boom angle sensor 137, the arm angle sensor 138, and the bucket angle sensor 139 are examples of a posture detection device.

In addition, hereinafter, the position, azimuth direction, and inclination angle of the swing body 120 are also referred to as swing body posture information representing a posture of the swing body 120.

The control device 127 receives an operation signal from the remote operation room 500. The control device 127 drives the work equipment 130, the swing body 120, or the travel body 110 based on the received operation signal.

<<Remote Operation Room>>

The remote operation room 500 includes an operator's seat 510, a display device 520, an operation device 530, and a control device 540.

The display device 520 is disposed in front of the operator's seat 510. The display device 520 is positioned in front of the operator's eyes when the operator sits in the operator's seat 510. The display device 520 may be configured by a plurality of arranged displays, or may be configured by one large display as illustrated in FIG. 1. In addition, the display device 520 may project an image on a curved surface or a spherical surface with a projector.

The operation device 530 is an operation device for the remote operation system. The operation device 530 generates, in response to operation by the operator, an operation signal of the boom cylinder 134, an operation signal of the arm cylinder 135, an operation signal of the bucket cylinder 136, a right-and-left swing operation signal of the swing body 120, and a travel operation signal of the travel body 110 for moving forward and backward and outputs the signals to the control device 540. The operation device 530 is configured by, for example, a lever, a knob switch, and a pedal (not illustrated).

The operation device 530 is disposed in the vicinity of the operator's seat 510. The operation device 530 is positioned within a range where the operator can operate when the operator sits in the operator's seat 510.

The control device 540 generates a display image based on information received from the work machine 100 and causes the display device 520 to display the display image. In addition, the control device 540 transmits an operation signal representing the operation of the operation device 530 to the work machine 100. The control device 540 is an example of a display control device.

Figure 4:
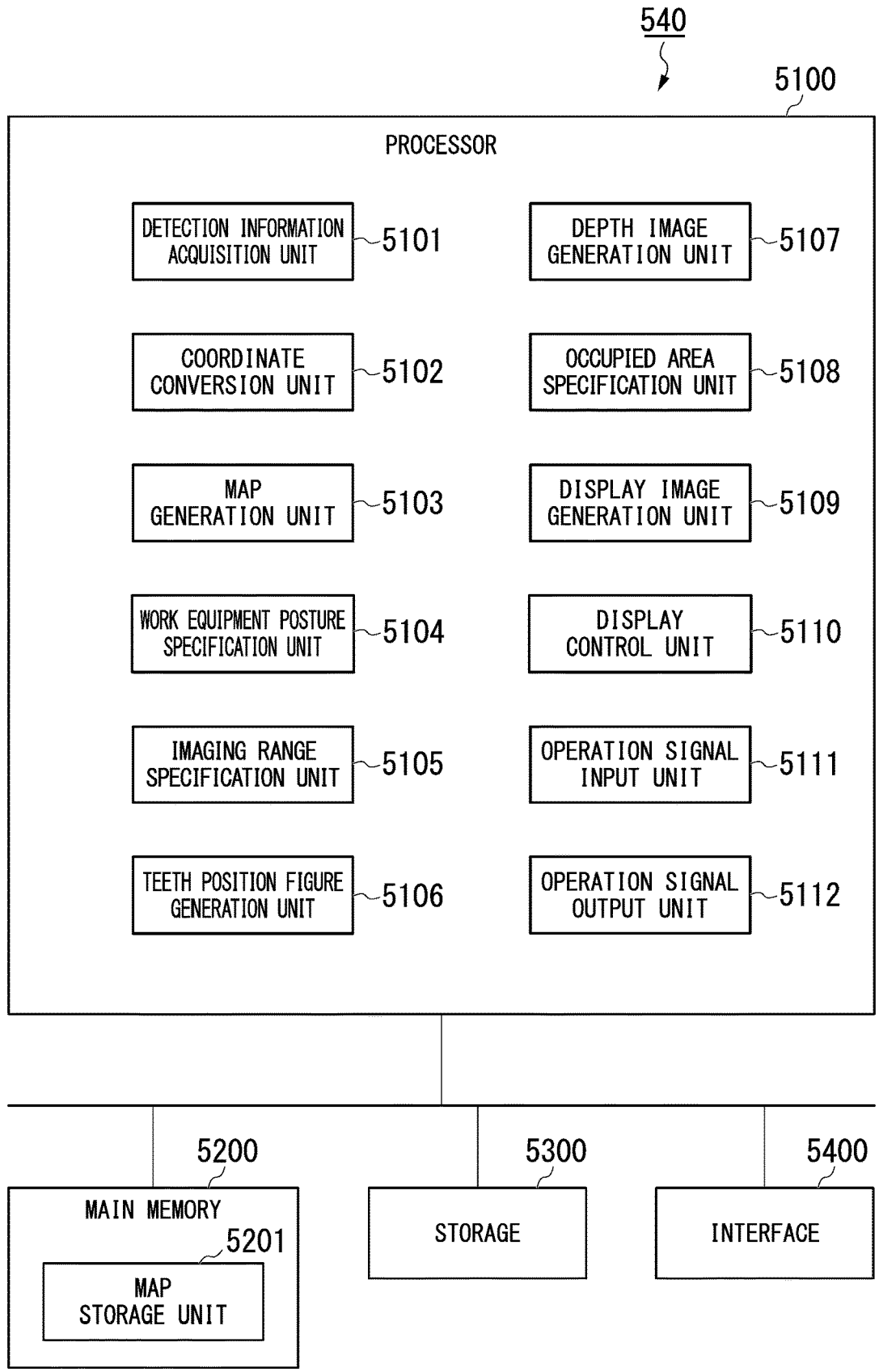
FIG. 4 is a schematic block diagram showing a configuration of a control device of a remote operation room according to the first embodiment.

FIG. 4 is a schematic block diagram showing a configuration of the control device of the remote operation room according to the first embodiment.

The control device 540 is a computer including a processor 5100, a main memory 5200, a storage 5300, and an interface 5400. The storage 5300 stores a program. The processor 5100 reads the program from the storage 5300 to load the program in the main memory 5200, and executes processing in accordance with the program. The control device 540 is connected to a network via the interface 5400.

Examples of the storage 5300 include an HDD, an SSD, a magnetic disk, a magneto-optical disk, a CD-ROM, a DVD-ROM, and a semiconductor memory. The storage 5300 may be an internal medium directly connected to a common communication line of the control device 540, or may be an external medium connected to the control device 540 via the interface 5400. The storage 5300 is a non-transitory tangible storage medium.

By executing the program, the processor 5100 secures a storage area of a map storage unit 5201 in the main memory 5200.

The map storage unit 5201 stores a three-dimensional map showing a three-dimensional shape of a construction target. In the three-dimensional map, the coordinates of the construction target are represented in the site coordinate system. The three-dimensional map is an example of topographical information.

By executing the program, the processor 5100 includes a detection information acquisition unit 5101, a coordinate conversion unit 5102, a map generation unit 5103, a work equipment posture specification unit 5104, an imaging range specification unit 5105, a teeth position figure generation unit 5106, a depth image generation unit 5107, an occupied area specification unit 5108, a display image generation unit 5109, a display control unit 5110, an operation signal input unit 5111, and an operation signal output unit 5112.

The detection information acquisition unit 5101 receives, from the control device 127, an image captured by the imaging device 122, the swinging speed, position, azimuth direction, and inclination angle of the swing body 120, the inclination angles of the boom 131, the arm 132, and the bucket 133, the traveling speed of the travel body 110, and depth information detected by the depth detection device 126. The detection information acquisition unit 5101 is an example of a captured image acquisition unit.

The coordinate conversion unit 5102 converts the coordinate system of depth information into the site coordinate system based on the position, azimuth direction, and inclination angle of the swing body 120. A depth coordinate system, which represents the coordinate system of the depth information, is a relative coordinate system of which origin is the position of the depth detection device 126. The depth information converted into the site coordinate system represents a three-dimensional shape of a construction target in the detection range R2 of the depth detection device 126.

The map generation unit 5103 updates a portion corresponding to the detection range R2 of the depth detection device 126, of a three-dimensional map stored in the map storage unit 5201, into a three-dimensional shape indicated by depth information which is converted into the site coordinate system by the coordinate conversion unit 5102. That is, the map generation unit 5103 generates a three-dimensional map representing the surrounding shape of the work machine 100 based on a combination of depth information and swing body posture information which are obtained at different timings. The three-dimensional map is an example of topographical information, and the map generation unit 5103 is an example of a topography acquisition unit. The different timings may be, for example, a timing for each predetermined swinging angle, a timing for each predetermined cycle during a swinging operation, or a timing obtained by adding a timing before or after a swinging operation thereto.

The work equipment posture specification unit 5104 specifies the posture of the work equipment 130 in a vehicle body coordinate system based on the inclination angles of the boom 131, the arm 132, and the bucket 133. The vehicle body coordinate system is a relative coordinate system of which origin is the position of the swing body 120. Specifically, the work equipment posture specification unit 5104 acquires the coordinates and absolute angle of a tip of the boom 131 based on the inclination angle of the boom 131 and the known length of the boom 131 (a distance from the pin at the base end portion to the pin at the tip portion). Herein, the absolute angle refers to an angle of each of the boom 131, the arm 132, and the bucket 133 with the swing body 120 as reference. The absolute angle is acquired by adding a pitch angle detected by the inclination measuring instrument 124 to each of inclination angles detected by the boom angle sensor 137, the arm angle sensor 138, and the bucket angle sensor 139. Similarly, the work equipment posture specification unit 5104 acquires the coordinates and absolute angle of the tip of the arm 132 and the coordinates and absolute angle of the tip (teeth) of the bucket 133. That is, the work equipment posture specification unit 5104 is an example of a posture acquisition unit that acquires bucket posture information. The work equipment posture specification unit 5104 converts the coordinate system of the posture of the work equipment 130 into the site coordinate system based on the position, azimuth direction, and inclination angle of the swing body 120.

In another embodiment, the work equipment posture specification unit 5104 may calculate, based on cylinder lengths and known dimensions, a relative angle of the boom 131 with respect to the swing body 120, a relative angle of the arm 132 with respect to the boom 131, and a relative angle of the bucket 133 with respect to the arm 132 to specify the posture of the work equipment 130.

The imaging range specification unit 5105 specifies the imaging range R1 of the imaging device 122 based on the position, azimuth direction, and inclination angle of the swing body 120. Specifically, the imaging range specification unit 5105 specifies a position of the imaging device 122 and a direction of an optical axis of the imaging device 122 based on the position, azimuth direction, and inclination angle of the swing body 120. The imaging range specification unit 5105 can specify the imaging range R1 of the imaging device 122 based on the specified position, the specified direction of the optical axis, and a known angle of view of the imaging device 122.

Figure 5:
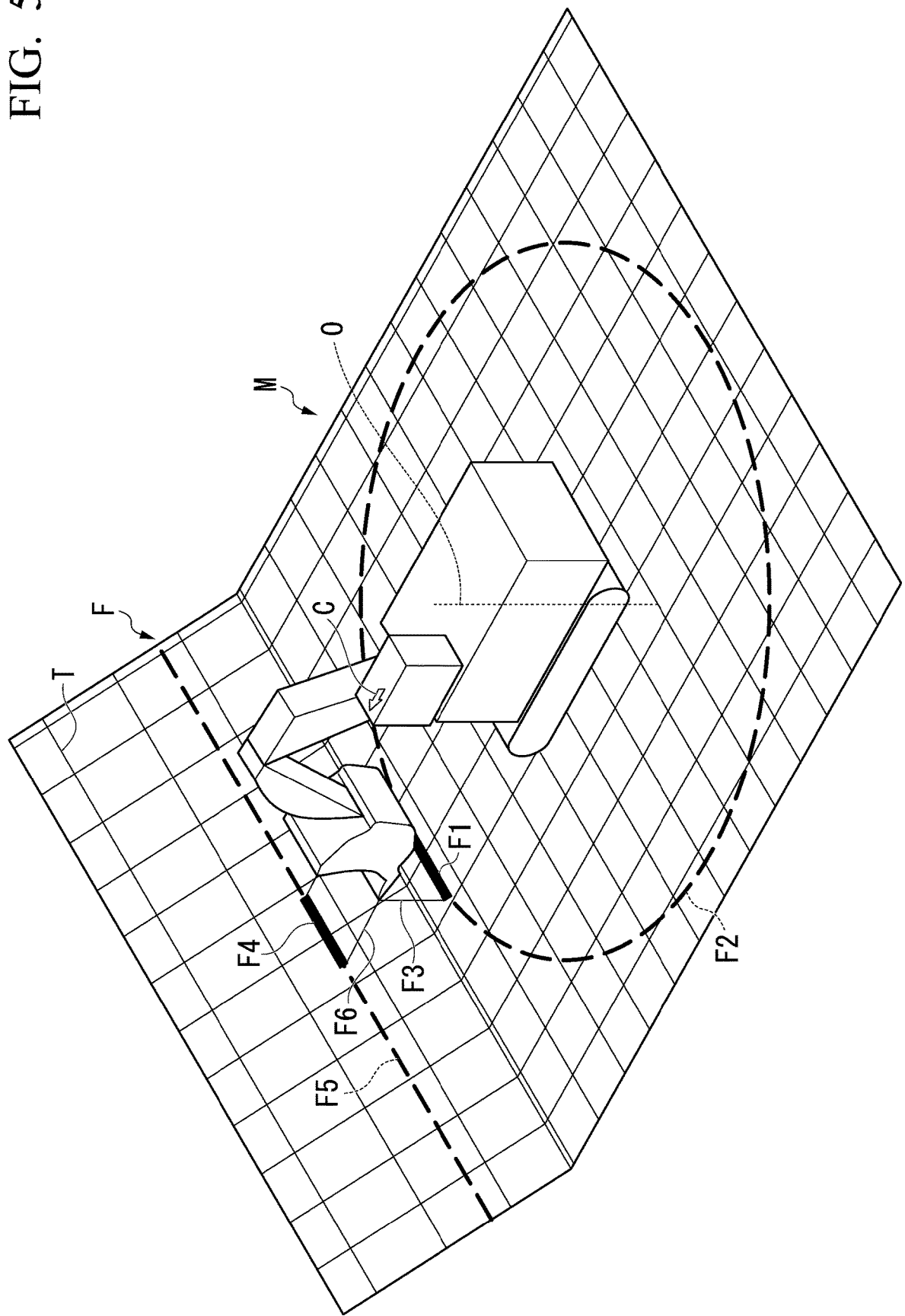
FIG. 5 is a view illustrating an example of a relationship between a three-dimensional map and a rendering camera in a virtual space.

FIG. 5 is a view illustrating an example of a relationship between a three-dimensional map and a rendering camera in a virtual space.

The imaging range specification unit 5105 determines a parameter of a rendering camera C for rendering a three-dimensional shape based on the specified imaging range. The rendering camera C is a virtual camera that shows a viewpoint for drawing a two-dimensional image from a three-dimensional shape disposed in the virtual space represented by the site coordinate system.

The teeth position figure generation unit 5106 generates a teeth position figure F, which is a figure representing the coordinates of the teeth projected on the ground surface, based on a three-dimensional map M stored in the map storage unit 5201 and the coordinates of the teeth of the bucket 133 specified by the work equipment posture specification unit 5104.

The teeth position figure F according to the first embodiment includes a lower projection line F1 which is obtained by projecting the teeth in a vertically downward direction on the three-dimensional map M, a lower extension line F2 which is obtained by extending the lower projection line F1 in a swinging direction of the swing body 120 along the ground surface, a lower auxiliary line F3 which connects the teeth to the lower projection line F1, a front projection line F4 which is obtained by projecting the teeth to the front of the work equipment on the three-dimensional map M, a front extension line F5 which is obtained by extending the front projection line F4 in an extending direction thereof along the ground surface, and a front auxiliary line F6 which connects the teeth to the front projection line F4. It is preferable that the front projection line F4 extends in a direction perpendicular to a direction in which the lower projection line F1 extends.

The lower projection line F1 and the lower extension line F2 are examples of a ground projection figure that represents points obtained by projecting the teeth of the bucket 133 in a vertical direction on the ground surface of a construction target. The front projection line F4 and the front extension line F5 are examples of a front projection figure that represents points obtained by projecting the teeth of the bucket 133 in a horizontal direction on an excavation surface of the construction target. The ground projection figure and the front projection figure according to another embodiment may be, for example, points obtained by projecting a center point of the teeth. That is, the ground projection figure and the front projection figure do not necessarily have to be lines.

The teeth position figure generation unit 5106 obtains a teeth position image by rendering the teeth position figure F based on a parameter of the rendering camera C determined by the imaging range specification unit 5105. The teeth position image is an example of a projected image. The teeth position figure generation unit 5106 is an example of a projected image generation unit.

The depth image generation unit 5107 generates a depth image representing a depth in the imaging range R1 based on the three-dimensional map M stored in the map storage unit 5201 and the parameter of the rendering camera C determined by the imaging range specification unit 5105. Specifically, the depth image generation unit 5107 projects a grid texture T in a planar manner from vertically above on the three-dimensional map M. The depth image generation unit 5107 obtains a depth image by rendering the three-dimensional map M, on which the grid texture T is projected, based on the parameter of the rendering camera C.

The occupied area specification unit 5108 specifies an area occupied by the work equipment 130 (occupied area) in a captured image based on the posture of the work equipment 130 specified by the work equipment posture specification unit 5104. For example, the occupied area specification unit 5108 disposes known three-dimensional shapes of the boom 131, the arm 132, and the bucket 133 in a virtual space based on the coordinates and absolute angles of the tips of the boom 131, the arm 132, and the bucket 133 specified by the work equipment posture specification unit 5104. The occupied area specification unit 5108 obtains a work equipment image by rendering the three-dimensional shapes of the boom 131, the arm 132, and the bucket 133 based on the parameter of the rendering camera C. The occupied area specification unit 5108 specifies an area where the boom 131, the arm 132, and the bucket 133 appear in the obtained work equipment image as the occupied area.

Figure 6:
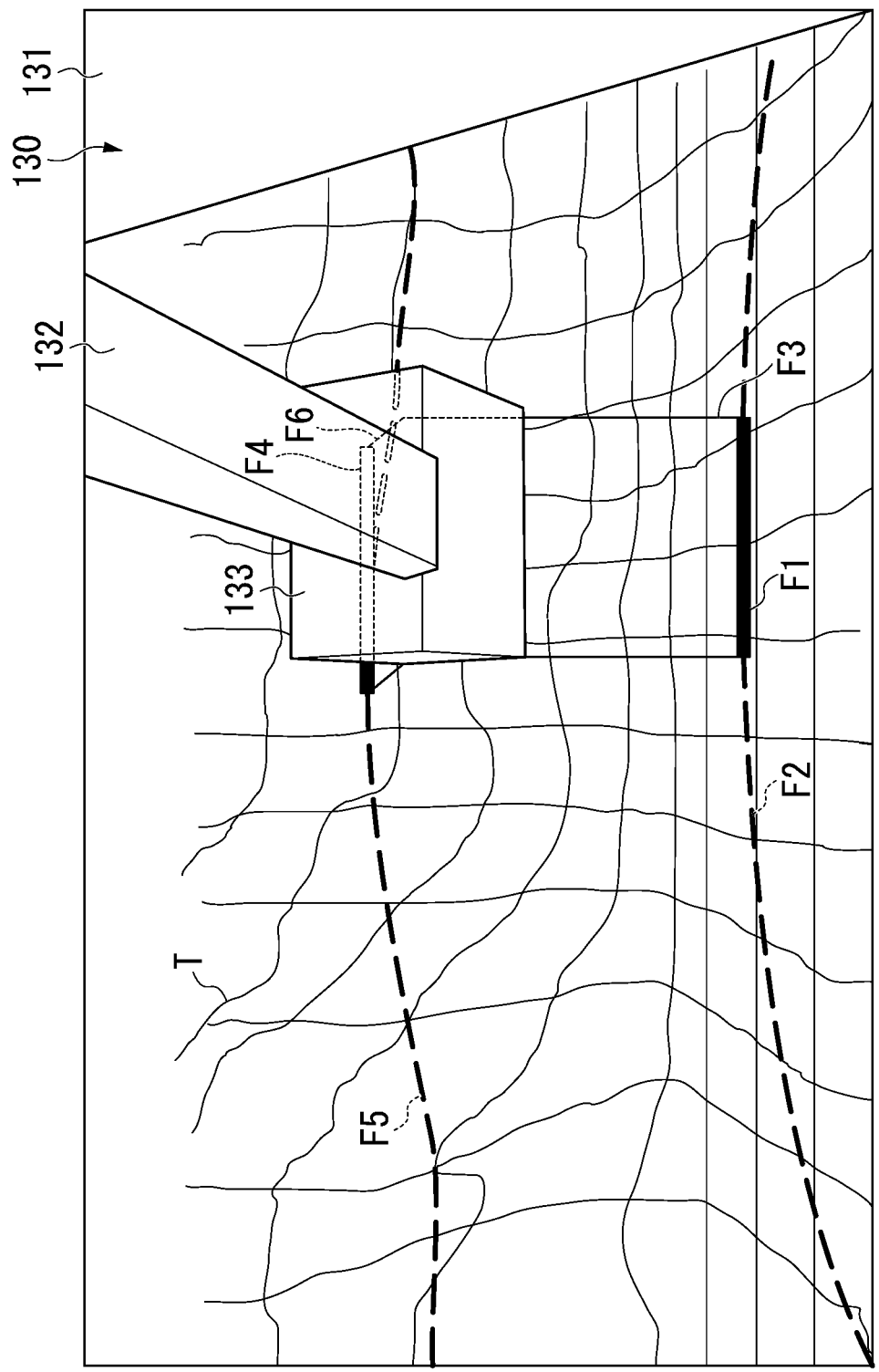
FIG. 6 is a view illustrating an example of a display image according to the first embodiment.

FIG. 6 is a view illustrating an example of a display image according to the first embodiment. The display image generation unit 5109 generates a display image for being displayed on the display device 520 by combining the received captured image, depth image, and teeth position image. Specifically, the display image generation unit 5109 generates a display image through the following procedures. The display image generation unit 5109 deletes a portion related to an occupied area from the depth image. In addition, the display image generation unit 5109 deforms a portion of the teeth position image, which is related to the occupied area, into a form different from those of the other portions. For example, the display image generation unit 5109 makes the line type, color, and transparency of the portion of the teeth position image, which is related to the occupied area, different from those of the other portions. The display image generation unit 5109 generates a display image by combining the depth image, from which the portion related to the occupied area is deleted, and the teeth position image, of which the portion related to the occupied area is made into a different form, with the captured image received by the detection information acquisition unit 5101. As illustrated in FIG. 6, the work equipment 130, a construction target, the grid texture T, and the teeth position figure F appear in the display image. By deleting the portion related to the occupied area from the teeth position image and the depth image, the grid texture T and the teeth position figure F are not displayed in a portion corresponding to the work equipment 130 on a display screen. Accordingly, the display device 520 can display a screen that is easy for a worker to view.

The display control unit 5110 outputs a display signal for displaying a display image to the display device 520.

The operation signal input unit 5111 receives input of an operation signal from the operation device 530. The operation signal includes a traveling operation signal of the travel body 110, a swing operation signal of the swing body 120, a vertical operation signal of the boom 131, a push or pull operation signal of the arm 132, and a rotating operation signal of the bucket 133.

The operation signal output unit 5112 outputs the operation signal input to the operation signal input unit 5111 to the work machine 100.

<<Display Control Method>>

Figure 7:
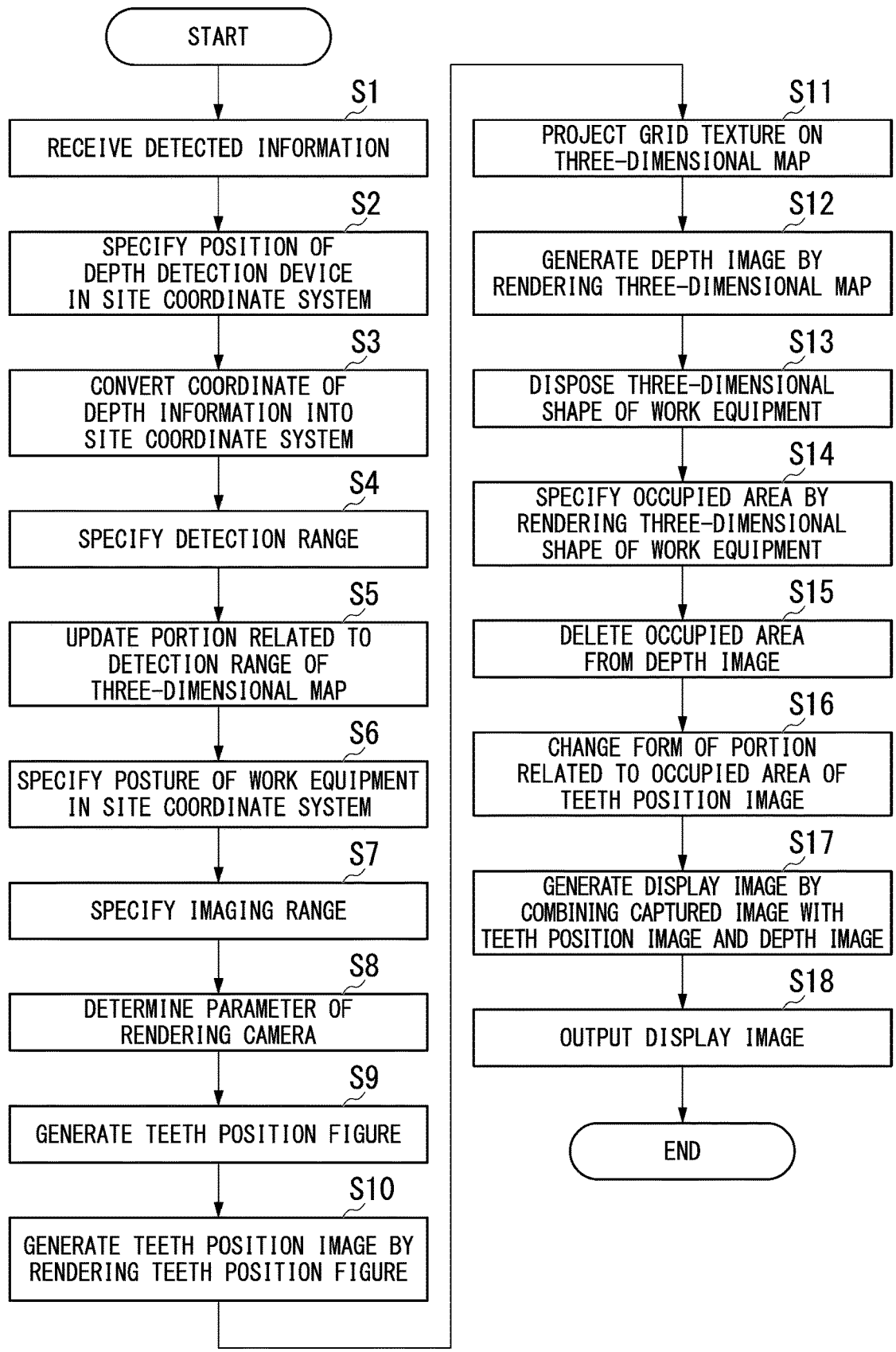
FIG. 7 is a flowchart showing display control processing performed by the control device of the remote operation room according to the first embodiment.

FIG. 7 is a flowchart showing display control processing performed by the control device of the remote operation room according to the first embodiment.

When the remote operation of the work machine 100 by the remote operation room 500 starts, the control device 540 executes the display control processing shown in FIG. 7 at regular time intervals.

The detection information acquisition unit 5101 receives, from the control device 127 of the work machine 100, an image captured by the imaging device 122, the position, azimuth direction, and inclination angle of the swing body 120, inclination angles of the boom 131, the arm 132, and the bucket 133, the traveling speed of the travel body 110, and depth information detected by the depth detection device 126 (Step S1). Next, the coordinate conversion unit 5102 specifies a position of the depth detection device 126 in the site coordinate system, an azimuth direction in which the optical axis faces, and the inclination angle of the optical axis based on the received position, azimuth direction, and inclination angle of the swing body 120 (Step S2). Since the depth detection device 126 is fixed to a prescribed place of the swing body 120, the coordinate conversion unit 5102 can specify a posture of the depth detection device 126 based on the posture of the swing body 120 by calculating a predetermined offset and rotation. The coordinate conversion unit 5102 converts the coordinate system of the received depth information into the site coordinate system based on the position of the depth detection device 126 in the site coordinate system, the azimuth direction in which the optical axis faces, and the inclination angle of the optical axis (Step S3).

The map generation unit 5103 specifies a portion corresponding to the detection range R2, of the three-dimensional map stored in the map storage unit 5201, based on the position of the depth detection device 126 in the site coordinate system, the azimuth direction in which the optical axis faces, and the inclination angle of the optical axis, which are specified in Step S2 (Step S4). That is, the map generation unit 5103 specifies a range within the known angle of view, of which center is the optical axis from the position of the depth detection device 126, in the three-dimensional map stored in the map storage unit 5201 as the detection range R2. The map generation unit 5103 updates a value of the three-dimensional map in the specified range to a value represented by the depth information converted into the site coordinate system (Step S5).

The work equipment posture specification unit 5104 specifies a posture of the work equipment 130 in the site coordinate system based on the inclination angles of the boom 131, the arm 132, and the bucket 133 and the position, the azimuth direction, and inclination angle of the swing body 120 (Step S6). The imaging range specification unit 5105 specifies the imaging range R1 of the imaging device 122 based on the swing body posture information (Step S7). The imaging range specification unit 5105 determines a parameter of the rendering camera C in a virtual space based on the imaging range R1 (Step S8).

The teeth position figure generation unit 5106 generates the teeth position figure F based on the three-dimensional map M stored in the map storage unit 5201 and coordinates of the teeth of the bucket 133 specified by the work equipment posture specification unit 5104 (Step S9). The teeth position figure generation unit 5106 generates a teeth position image by rendering the teeth position figure F based on the parameter of the rendering camera C determined in Step S8 (Step S10).

The depth image generation unit 5107 projects the grid texture T in a planar manner from vertically above on the three-dimensional map M (Step S11). The depth image generation unit 5107 generates a depth image by rendering the three-dimensional map M, on which the grid texture T is projected, based on the parameter of the rendering camera C determined in Step S8 (Step S12).

The occupied area specification unit 5108 disposes known three-dimensional shapes of the boom 131, the arm 132, and the bucket 133 in the virtual space based on the coordinates and absolute angles of the tips of the boom 131, the arm 132, and the bucket 133 specified by the work equipment posture specification unit 5104 (Step S13). The occupied area specification unit 5108 specifies an occupied area, in which the work equipment 130 appears, in an image by rendering the three-dimensional shapes of the boom 131, the arm 132, and the bucket 133 based on the parameter of the rendering camera C determined in Step S8 (Step S14). In the work machine 100 according to another embodiment, part of the travel body 110 appears in the image depending on a swinging angle in some cases. In this case, the occupied area specification unit 5108 may further dispose a known three-dimensional shape of the travel body 110 in the virtual space to specify an occupied area of the image, in which the travel body 110 and the work equipment 130 appear. In addition, in the work machine 100 according to another embodiment, part of the swing body 120 (pillars or handrails of a passage) appears in the image in some cases. Since the imaging device 122 is fixed to the swing body 120, a position of the swing body 120 that appears in the image does not change depending on a posture of the work machine 100. In this case, the occupied area specification unit 5108 may further specify a known occupied area of the image, in which part of the swing body 120 appears.

The display image generation unit 5109 deletes a portion related to the occupied area specified in Step S14 from the depth image generated in Step S12 (Step S15). In addition, the display image generation unit 5109 makes a form of a portion related to the occupied area specified in Step S14, of the teeth position image generated in Step S10, different (Step S16).

Next, the display image generation unit 5109 generates a display image by combining the depth image, from which the portion related to the occupied area is deleted, and the teeth position image, of which the portion related to the occupied area is made into a different form, with the captured image received by the detection information acquisition unit 5101 (Step S17). Then, the display control unit 5110 outputs a display signal for displaying the display image to the display device 520 (Step S18).

Accordingly, the display image illustrated in FIG. 6 is displayed on the display device 520.

<<Operation and Effects>>

As described above, in the first embodiment, the control device 540 generates a teeth position image representing points obtained by projecting the teeth of the bucket 133 on a construction target based on bucket posture information and the three-dimensional map M and outputs a display signal for displaying by superimposing the teeth position image on a place where at least the work equipment 130 appears in a captured image. Accordingly, the operator can easily recognize a teeth position that is a portion which is a shadow of the bucket 133.

In addition, in the first embodiment, the control device 540 displays the teeth position image superimposed on the place where the bucket 133 appears in the captured image and the teeth position image superimposed on a place where the bucket 133 does not appear in the captured image in different forms. Accordingly, the operator can easily recognize a portion which is the shadow of the bucket and the other portions, in the teeth position image.

Second Embodiment

The work system 1 according to the first embodiment generates a teeth position image based on the three-dimensional map M generated based on a plurality of pieces of depth information obtained at different timings. On the contrary, the work system 1 according to a second embodiment generates a teeth position image based on instantaneous data of depth information.

<<Work Machine>>

Figure 8:
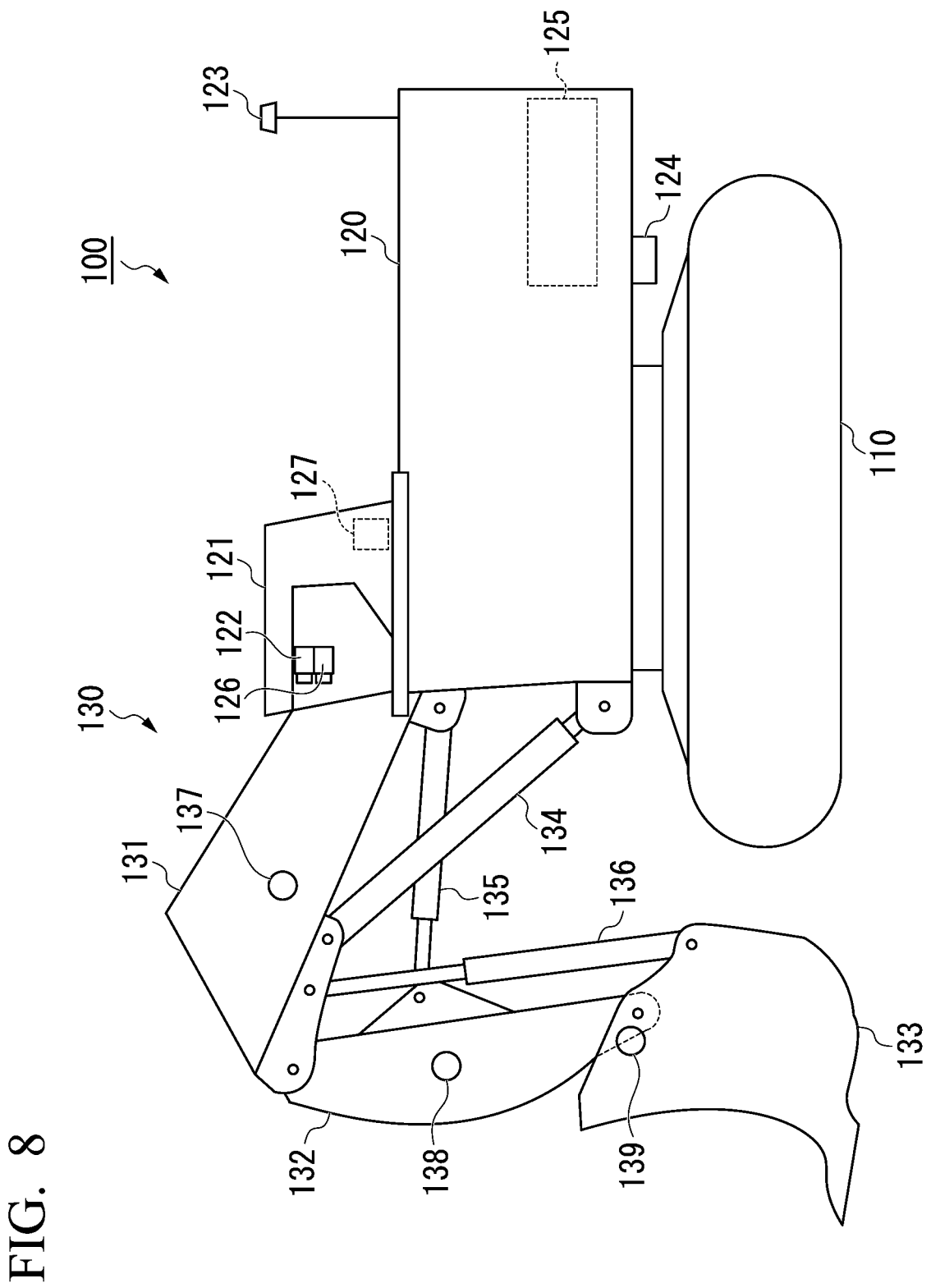
FIG. 8 is an external view of a work machine according to a second embodiment.

FIG. 8 is an external view of a work machine according to the second embodiment. The depth detection device 126 of the work machine 100 according to the second embodiment is provided side by side with the imaging device 122 inside the cab 121. For this reason, the detection range R2 of the depth detection device 126 is substantially the same as the imaging range R1 of the imaging device 122. That is, the depth detection device 126 is provided at a place where the bucket 133 interferes with the detection range R2.

<<Control Device of Remote Operation Room>>

Figure 9:
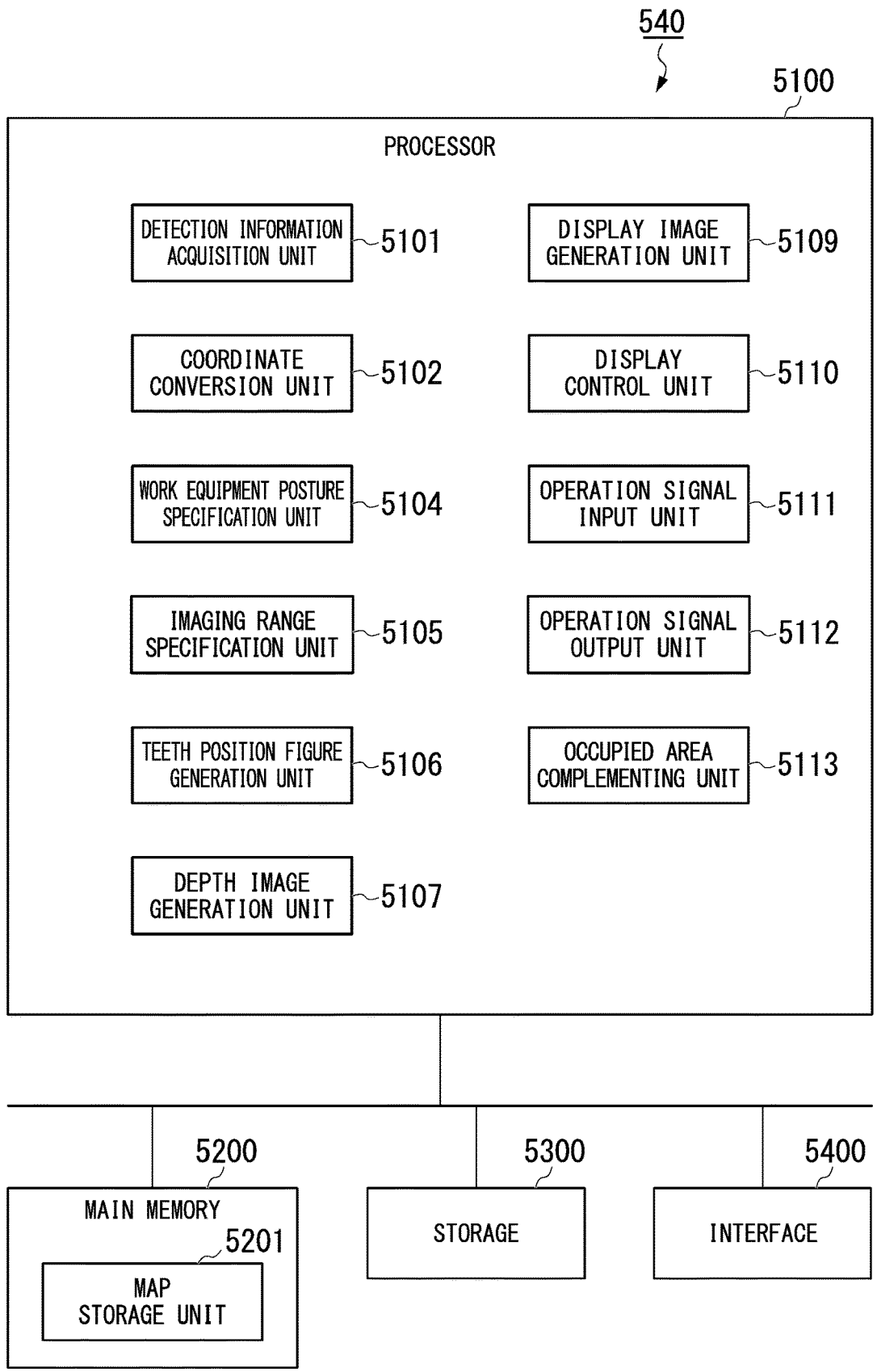
FIG. 9 is a schematic block diagram showing a configuration of a control device of a remote operation room according to the second embodiment.

FIG. 9 is a schematic block diagram showing a configuration of a control device of a remote operation room according to the second embodiment.

The control device 540 of the remote operation room 500 according to the second embodiment does not include the map generation unit 5103 and the occupied area specification unit 5108 of the first embodiment, but includes an occupied area complementing unit 5113. The occupied area complementing unit 5113 removes a portion related to an occupied area from depth information and complements the portion related to the occupied area based on information around the occupied area. For example, the occupied area complementing unit 5113 can complement the portion of the depth information, which is related to the occupied area, by attaching a polygon to the removed area based on a point group related to the depth information, in particular, the depth information from which the occupied area is removed.

<<Display Control Method>>

Figure 10:
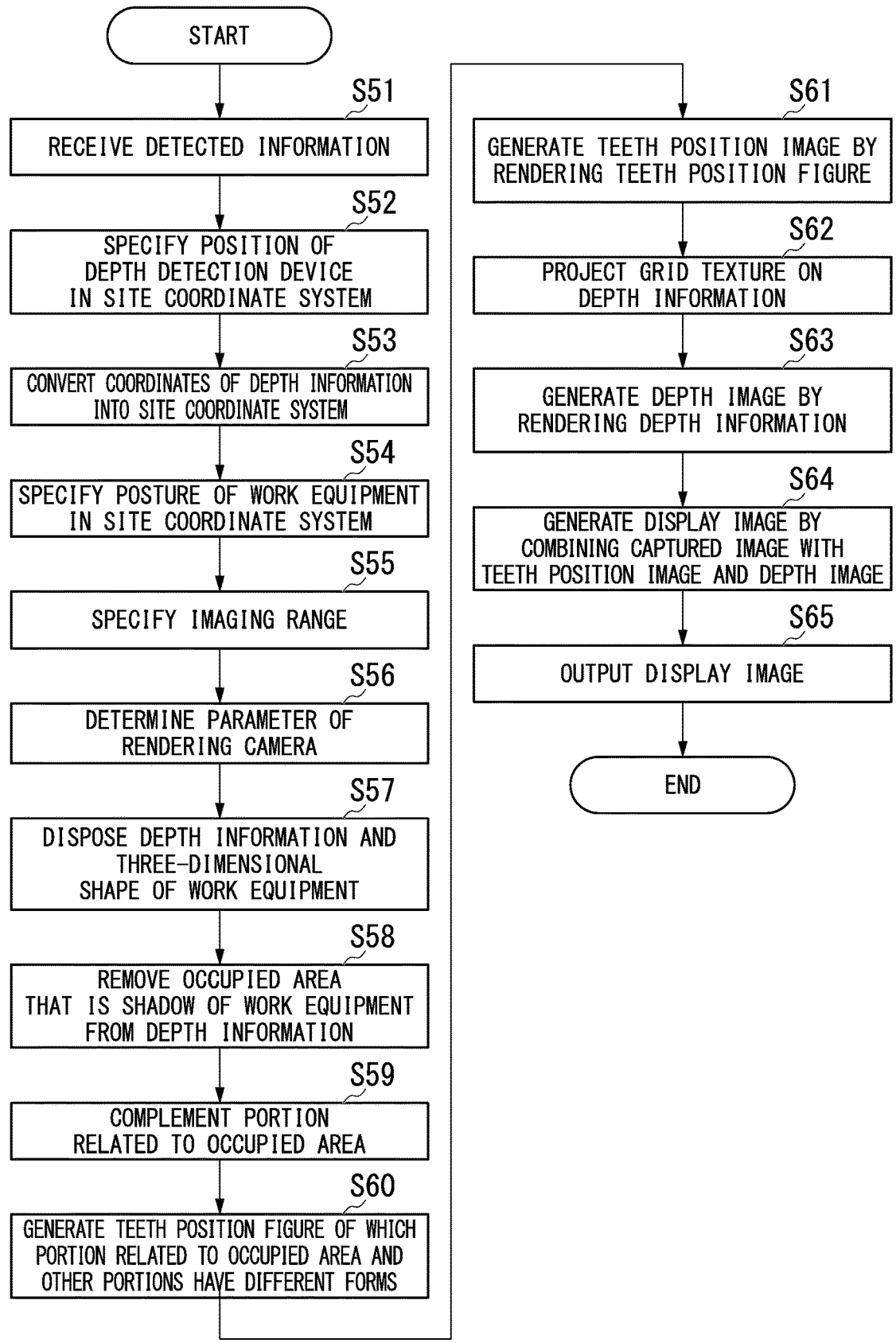
FIG. 10 is a flowchart showing display control processing performed by the control device of the remote operation room according to the second embodiment.

FIG. 10 is a flowchart showing display control processing performed by the control device of the remote operation room according to the second embodiment.

When the remote operation of the work machine 100 by the remote operation room 500 starts, the control device 540 executes the display control processing shown in FIG. 10 at regular time intervals.

The detection information acquisition unit 5101 receives, from the control device 127 of the work machine 100, an image captured by the imaging device 122, the position, azimuth direction, and inclination angle of the swing body 120, inclination angles of the boom 131, the arm 132, and the bucket 133, the traveling speed of the travel body 110, and depth information detected by the depth detection device 126 (Step S51). Next, the coordinate conversion unit 5102 specifies a position of the depth detection device 126 in the site coordinate system, an azimuth direction in which the optical axis faces, and the inclination angle of the optical axis based on the received position, azimuth direction, and inclination angle of the swing body 120 (Step S52). The coordinate conversion unit 5102 converts the coordinate system of the received depth information into the site coordinate system based on the position of the depth detection device 126 in the site coordinate system, the azimuth direction in which the optical axis faces, and the inclination angle of the optical axis (Step S53).

The work equipment posture specification unit 5104 specifies a posture of the work equipment 130 in the site coordinate system based on the inclination angles of the boom 131, the arm 132, and the bucket 133 and the position, the azimuth direction, and inclination angle of the swing body 120 (Step S54). The imaging range specification unit 5105 specifies the imaging range R1 of the imaging device 122 based on the swing body posture information (Step S55). The imaging range specification unit 5105 determines a parameter of the rendering camera C in a virtual space based on the imaging range R1 (Step S56).

The occupied area complementing unit 5113 disposes a shape of a construction target indicated by the depth information after coordinate conversion and known three-dimensional shapes of the boom 131, the arm 132, and the bucket 133 in the virtual space based on the coordinates and absolute angles of the tips of the boom 131, the arm 132, and the bucket 133 specified by the work equipment posture specification unit 5104 (Step S57). The occupied area complementing unit 5113 specifies an occupied area, which is a shadow of the work equipment 130, from the shape of the construction target through ray tracing of which center is the rendering camera C determined in Step S56. The occupied area complementing unit 5113 removes a portion related to the occupied area from the depth information (Step S58). The occupied area complementing unit 5113 complements the portion related to the occupied area in the depth information from which the portion related to the occupied area is removed (Step S59).

Next, the teeth position figure generation unit 5106 generates the teeth position figure F based on the depth information, of which the portion related to the occupied area is complemented, and the coordinates of the teeth of the bucket 133 specified by the work equipment posture specification unit 5104 (Step S60). At this time, the teeth position figure generation unit 5106 generates the teeth position figure F such that the portion related to the occupied area stored in Step S59 and the other portions have different forms. The teeth position figure generation unit 5106 generates a teeth position image, of which a portion related to the occupied area and the other portions have different forms, by rendering the teeth position figure F based on the parameter of the rendering camera C determined in Step S56 (Step S61).

The depth image generation unit 5107 projects the grid texture T in a planar manner from vertically above on the shape of the construction target represented by the depth information (Step S62). The depth image generation unit 5107 generates a depth image by rendering the shape of the construction target, on which the grid texture T is projected, based on the parameter of the rendering camera C determined in Step S56 (Step S63).

Next, the display image generation unit 5109 generates a display image by combining the teeth position image and the depth image, from which the portion related to the occupied area is deleted, with the captured image received by the detection information acquisition unit 5101 (Step S64). Then, the display control unit 5110 outputs a display signal for displaying the display image to the display device 520 (Step S65).

<<Operation and Effects>>

As described above, in the second embodiment, the control device 540 generates a teeth position image representing points obtained by projecting the teeth of the bucket 133 on a construction target based on bucket posture information and depth information and outputs a display signal for displaying the teeth position image by superimposing the teeth position image on a place, in which at least the work equipment 130 appears, in a captured image. Accordingly, similar to the first embodiment, the operator can easily recognize a teeth position that is a portion which is the shadow of the bucket 133.

In addition, in the second embodiment, the control device 540 complements an occupied area, which is a shadow of the work equipment 130, in the depth information and generates a teeth position image based on the occupied area. Accordingly, even in a case where part of the depth information is the shadow of the work equipment 130, the teeth position image can be appropriately generated. In another embodiment, the control device 540 may not perform complement processing on the occupied area by providing the depth detection device 126 outside from a side surface of the work equipment 130, including part of a line obtained by projecting the teeth on the construction target in the detection range R2 of the depth detection device 126, and extending the line to a bucket 133 side to generate the lower projection line F1 and the front projection line F4.

Another Embodiment

Although one embodiment has been described in detail with reference to the drawings hereinbefore, a specific configuration is not limited to the description above, and various design changes are possible.

Although display information according to the embodiments described above is a combination of a captured image and a depth image, the display information is not limited thereto. For example, the display information according to another embodiment may include the three-dimensional map M or depth information, instead of the captured image, and computer graphics generated from a model of the work machine 100.

Although the control device 540 according to the embodiments described above separately generates a teeth position image and a depth image, the invention is not limited thereto. For example, the control device 540 according to another embodiment may generate a depth image in which the grid texture T and the teeth position figure F appear by rendering the three-dimensional map M or depth information, on which the grid texture T is projected, and the teeth position figure F together.

In addition, although the control device 540 according to another embodiment superimposes the teeth position image and the depth image on the captured image, the invention is not limited thereto. For example, the control device 540 according to another embodiment may superimpose only one of the teeth position image and the depth image on the captured image. Since the teeth position image is an image representing a depth, which is generated based on the three-dimensional map M, the teeth position image is also an example of the depth image.

The teeth position figure F according to another embodiment may not necessarily have to include all of the lower projection line F1, the lower extension line F2, the lower auxiliary line F3, the front projection line F4, the front extension line F5, and the front auxiliary line F6. In addition, the teeth position figure F according to another embodiment may be another figure. For example, the teeth position figure F may be another figure such as a bucket shadow figure obtained by projecting the shape of the bucket 133, or a teeth center plot obtained by projecting a center point of the teeth of the bucket 133.

Both of a bucket shadow figure obtained by projecting the shape of the bucket 133 on a ground surface and a teeth center plot obtained by projecting the center point of the teeth of the bucket 133 on the ground surface are examples of the ground projection figure. In addition, both of a bucket shadow figure obtained by projecting the shape of the bucket 133 on an excavation surface and a teeth center plot obtained by projecting the center point of the teeth of the bucket 133 on the excavation surface are examples of the front projection figure.

Although the control device 540 according to the embodiments described above removes a portion related to an occupied area from a teeth position image and a depth image to superimpose on a captured image, the invention is not limited thereto. For example, the control device 540 according to another embodiment may generate a display image by superimposing on the captured image without removing the portion related to the occupied area from the teeth position image and the depth image. In this case, the teeth position figure F hidden by the work equipment 130 and the grid texture T representing a depth are drawn also in a portion of the captured image, in which the work equipment 130 appears.

Accordingly, the operator can have a sense of perspective even with respect to a portion hidden by the work equipment 130.

Although depth information and the three-dimensional map M, which are used in the calculation of a depth image by the control device 540, are detected by the depth detection device 126 mounted on the work machine 100, which is an operation target of the control device 540, in the embodiments described above, the invention is not limited thereto. For example, the control device 540 according to another embodiment may calculate a depth image using depth information detected by the depth detection device 126 mounted on another work machine 100 or the depth detection device 126 mounted on another device such as a drone. In this case, the control device 540 may generate the three-dimensional map M using the depth information detected by the depth detection device 126 mounted on another work machine 100 or the depth detection device 126 mounted on another device such as a drone.

Although the control device 540 functions as the display control device in the embodiments described above, the invention is not limited thereto. For example, in the work system 1 according to another embodiment, the control device 127 may function as the display control device. That is, in the work system 1 according to another embodiment, the control device 127 may generate a depth image and display the depth image on the display device 520 of the remote operation room 500. In addition, in another embodiment, the display control device may be provided separately from the work machine 100 and the remote operation room 500. In addition, in another embodiment, some functional units of the display control device may be provided in the remote operation room 500, and the remaining functional units may be provided in the work machine 100. In this case, the display control device is realized by a combination of the work machine 100 and the remote operation room 500.

INDUSTRIAL APPLICABILITY

In the present invention, the operator can easily recognize a teeth position of a portion that is the shadow of the bucket.

The invention claimed is:

1. A display control device configured to display an image for operating a work machine including a bucket that has teeth facing a front of the work machine, the display control device comprising:
a processor that is configured to:
acquire an image captured by an imaging device provided at a place of the work machine, the image including a bucket image of the bucket,
acquire bucket posture information representing a posture of the bucket,
acquire topographical information indicating a three-dimensional shape of a construction target of the work machine,
generate, based on the bucket posture information and the topographical information, a projected image obtained by projecting the teeth of the bucket in a horizontal direction to an excavation surface of the construction target, and
output a display signal for displaying a display image by superimposing the projected image on the bucket image in the captured image,
wherein the processor is further configured to output the display signal for displaying (i) a first portion of the projected image of the teeth of the bucket in a first form and (ii) a second portion of the projected image of the teeth of the bucket in a second form different from the first form, and
wherein the first portion of the projected image overlaps with the bucket image in the captured image, and the second portion of the projected image is disposed outside the bucket image in the captured image.

2. The display control device according to claim 1, wherein the processor is further configured to acquire depth information generated by a depth detection device provided in the work machine as the topographical information.

3. The display control device according to claim 2, wherein the processor is further configured to:
complement the depth information related to an occupied area, the occupied area being covered by the bucket or a shadow of the bucket, and
wherein the depth detection device is provided at a place where the bucket interferes with a detection range.

4. The display control device according to claim 1, wherein the processor is further configured to:
display the projected image including at least one of (i) a front projection line obtained by projecting the teeth of the bucket to a front of the work machine or (ii) a front auxiliary line connecting the teeth of the bucket and the front projection line.

5. The display control device according to claim 1, wherein the first form includes a line, and the second form includes another line having a different form from the line of the first form.

6. The display control device according to claim 1, wherein the first form includes a first dashed line, and the second form includes a solid line or a second dashed line different from the first dashed line.

7. The display control device according to claim 1, wherein the first form includes a blank region or a first dashed line, and the second form includes a solid line or a second dashed line different from the first dashed line.

8. A display control method for displaying an image used to operate a work machine including a bucket that has teeth facing a front of the work machine, the display control method comprising:
acquiring an image captured by an imaging device provided at a place of the work machine, the image including a bucket image of the bucket;
acquiring bucket posture information representing a posture of the bucket;
acquiring topographical information indicating a three-dimensional shape of a construction target of the work machine;
generating, based on the bucket posture information and the topographical information, a projected image obtained by projecting the teeth of the bucket in a horizontal direction to an excavation surface of the construction target; and
outputting a display signal for displaying a display image by superimposing the projected image on the bucket image in the captured image,
wherein outputting the display signal comprises displaying (i) a first portion of the projected image of the teeth of the bucket in a first form and (ii) a second portion of the projected image of the teeth of the bucket in a second form different from the first form, and
wherein the first portion of the projected image overlaps with the bucket image in the captured image, and the second portion of the projected image is disposed outside the bucket image in the captured image.

9. A system comprising:
a work machine including a bucket, teeth of the bucket facing a front of the work machine; and
a remote operation room that accommodates:
  a display device, and
  a display control device configured to control the display device to display one or more images for operating the work machine,
wherein the display control device includes a processor that is configured to:
  acquire an image captured by an imaging device provided at a place of the work machine, the image including a bucket image of the bucket,
  acquire bucket posture information representing a posture of the bucket,
  acquire topographical information indicating a three-dimensional shape of a construction target of the work machine,
  generate, based on the bucket posture information and the topographical information, a projected image obtained by projecting the teeth of the bucket in a horizontal direction to an excavation surface of the construction target, and
  output a display signal to the display device for displaying a display image by superimposing the projected image on the bucket image in the captured image, and
wherein the processor is further configured to output the display signal for displaying (i) a first portion of the projected image of the teeth of the bucket in a first form and (ii) a second portion of the projected image of the teeth of the bucket in a second form different from the first form, and
wherein the first portion of the projected image overlaps with the bucket image in the captured image, and the second portion of the projected image is disposed outside the bucket image in the captured image.

* * * * *